J. M. BACON.
SEED PLANTING CULTIVATOR.
No 31,433.  Patented Feb. 19, 1861.
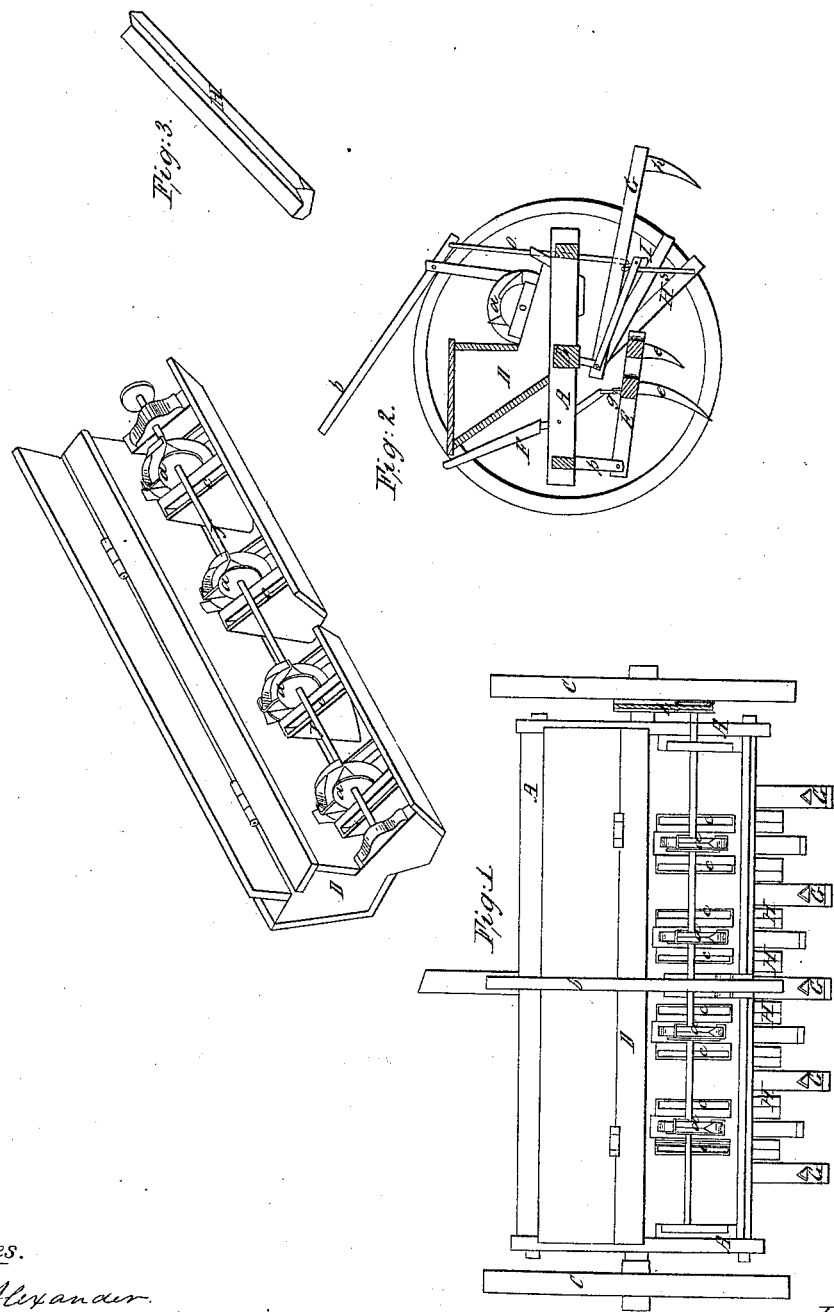
Witnesses.
Inventor.

UNITED STATES PATENT OFFICE.

J. M. BACON, OF RIPON, WISCONSIN.

IMPROVEMENT IN SEEDING-MACHINES.

Specification forming part of Letters Patent No. 31,433, dated February 19, 1861.

*To all whom it may concern:*

Be it known that I, J. M. BACON, of Ripon, in the county of Fond du Lac and State of Wisconsin, have invented certain new and useful Improvements in Seed-Planting Cultivators; and I do hereby declare that the following is a full, clear, and exact description of the same, reference being had to the accompanying drawings, and to the letters of reference marked thereon.

The nature of my invention consists in constructing and arranging the several parts of this machine in the manner hereinafter set forth.

In the annexed drawings, Figure 1 represents a plan view. Fig. 2 is a vertical cross-section. Fig. 3 is a perspective of the seed-hopper.

In the figures, A represents a square frame, made of any suitable size and supported upon an axle, B. This axle B, as is usually the case, is supported upon two wheels, C C.

D represents a seed box or hopper, which is situated upon the frame A, and which is provided with two apartments. One is used for holding the seed to be distributed, while in the other a series of distributing-wheels are placed. An opening or a series of openings are made between the two apartments, so as to allow the seed to pass from one to the other.

*a a a* represent the series of distributing-wheels, which are secured upon a shaft, J, which is revolved by means of a band, L, which passes around a pulley on said shaft and one upon one of the wheels C. These wheels *a a a* are provided with cups upon their peripheries which catch and raise the seed. The wheels are cut in a V shape upon their peripheries just in front of the cups, so that when the seed is raised to the highest point on the wheel it slides out of the cups on both sides of the wheels and falls into the spouts *c c*, from whence it falls down upon the troughs H.

H H represent a series of separate and independent troughs, which are hinged to the under side of the frame, into which the seed falls, and which carry the seed to the ground. Hinged to the frame A, and standing above these troughs, are a series of bars, G G, to the ends of which are secured covering-teeth *h h*. These teeth drag in the earth behind the troughs and serve to throw the earth upon the seed.

I represents a bar which lies between the bars G and the troughs H. A series of loops pass from the under side of this bar around the troughs.

*b* represents a lever which connects to and operates the bar I by means of a cord or rod, *o*. By operating this lever it will be readily seen that the bars G and the troughs H are raised or lowered simultaneously.

E represents a cultivator-frame, which is hinged to the bar *p*, depending from the front of frame A. Said frame is provided with cultivator-teeth *e e*, and is operated by means of a lever, F, which connects to it by a chain, link, or otherwise at *g*.

By removing the drill-troughs this machine may be used for sowing broadcast, and by removing the seed-box, or even with it on it, may be used as a cultivator.

I may use a roller for rolling the earth with this machine, either preparing it for seed or rolling it in.

Having thus fully described my invention, what I claim as new, and desire to secure by Letters Patent, is—

The arrangement of the seed-box D, the shaft J, the wheels *a a*, provided with cups and constructed on their peripheries as described, and the discharge-spouts on each side of the wheels, with the bar G, the troughs H, and the cultivator-frame E, regulated and used as described, for the purpose set forth.

In witness that I claim the above I have hereunto set my hand in the presence of the subscribing witnesses.

J. M. BACON.

Witnesses:
S. HAZEN,
I. I. FOOTE.